UNITED STATES PATENT OFFICE.

JEROME ALEXANDER, OF NEW YORK, N. Y.

ADHESIVE AND THE LIKE.

1,300,096.     Specification of Letters Patent.     Patented Apr. 8, 1919.

No Drawing.     Application filed July 9, 1914. Serial No. 849,864.

*To all whom it may concern:*

Be it known that I, JEROME ALEXANDER, a citizen of the United States, residing in the borough of Manhattan, city, county, and State of New York, have invented certain new and useful Improvements in Adhesives and the like, of which the following is a specification.

My invention relates to an improved adhesive which has glue for its base and which readily dissolves in water at ordinary temperatures. Ordinarily glue is dissolved by stirring it into boiling water or else by mixing with cold water and then heating or boiling. My improved product has the advantage of doing away with the necessity for heating or using hot water or other hot solvent, and my product may thus be taken from the package, dissolved in cold water, and be ready for use at once. It can largely be used as a substitute for liquid fish glue, and, because of the fact that it is dry, can be packed in less expensive containers, and is of relatively much smaller bulk because of the absence of included moisture, therefore possessing all the many advantages which a dry powder has over a liquid.

This application is in greater part a continuation of my co-pending application Serial Number 663,352, filed December 1, 1911.

My improved adhesive consists of a dry mixture of finely divided glue and a metallic salt having a marked affinity for water, whereby the glue may be caused to dissolve in water at ordinary temperatures. I prefer, however, to use as the metallic salt one which not only has a marked affinity for water but which also develops heat upon the addition of water, and thereby assists in dissolving the glue. I particularly prefer as such salt a metallic chlorid, since this salt, in addition to the two desired properties stated, has the further property of tending to inhibit the undue formation of gel in a glue solution, which is an added feature of advantage, while permitting the partial gelatinization of the glue upon the cooling of the solution. Of the metallic chlorids, I prefer calcium chlorid because of its low cost.

As an illustration of a specific glue or adhesive which comes within my broad invention, I give the following example:

Take fifty (50) parts by weight of finely ground or powdered glue having a jelly test of 50 (when tested according to the process described in a paper by the patentee entitled "Grading and use of glues and gelatines," published February 28, 1906, in the *J. Soc. Chem. Ind.*), which corresponds to the grade commonly known in this country as Cooper's 1¾. To this add seventeen (17) parts of dry finely granulated or powdered commercial calcium chlorid and mix the two thoroughly together. This dry mixture constitutes a glue within my invention which is soluble in cold water and which when stirred with about fifty (50) parts of water at ordinary temperature (for example about 20 deg. C.) will pass entirely into solution. Not only does the calcium chlorid cause the glue to be soluble in water, but the action of this chemical with water is exothermic, that is, causes the temperature of the water to rise rapidly, about 15 deg. C. or more, depending somewhat upon the purity of the calcium chlorid used, and this increase in temperature naturally assists in the solution of the glue. The calcium chlorid, as is well known, is itself extremely soluble in water.

It is obvious that in order to effect a more intimate mixture, the salt and the glue may first be brought into solution with water, separately combined, and then evaporated to dryness. If the residue is finely divided the result will be a glue soluble in cold water which is similar to that obtained by pulverizing and mechanically intimately mixing the components, and I consider this method of effecting the intimate mixture of the components as being within the scope of my invention. In some instances it may be desirable to form the components into tablets, instead of finely dividing the mixture, but in this case the time required for complete solution is naturally longer than that which obtains when the dry mixture is pulverized or otherwise finely divided.

The proportion of calcium chlorid to be used with any specific kind of glue will vary according to the jelly test of the glue, the rule being that the higher the jelly test, the larger the percentage of calcium chlorid required to cause the glue to go into solution at a given temperature in a given amount of water.

In the formula given above, the proportion of calcium chlorid causes the glue to dissolve readily and to retain permanently its fluidity at ordinary temperatures. In some cases, however, it is desirable to add a sufficiently smaller quantity of the calcium chlorid to cause the glue to dissolve in water, but to permit it subsequently to gelatinize partially upon cooling or standing. This is particularly advantageous where the glue is used with whiting, clay, or similar substances, to form a calcimine, because the partial gelatinization of the glue on cooling or standing prevents, or tends to prevent, the whiting or other solid from settling out, and forms a calcimine which is in effect a thin jelly, holding the solid in uniform suspension but at the same time being sufficiently thin to be applied readily when it is desired to use it in the usual manner.

While I have spoken of the use of calcium chlorid, I am aware that certain other substances such as magnesium chlorid and zinc chlorid may be substituted in suitable proportions to produce an adhesive having similar properties to those already described, but for commercial use I regard calcium chlorid as the most desirable substance, owing to its relative cheapness. All these substances are metallic salts having a marked affinity for water and whose action with water is exothermic.

Certain metallic salts beside the metallic chlorids have like functional efficiency as to the characteristics of marked affinity for water and of tendency to inhibit pronounced gelatinization in a glue solution, but do not afford the additional advantages attained by the employment of the exothermic metallic salts. The present application is limited accordingly to the metallic salts of chlorid, and particularly to calcium chlorid.

To improve the keeping qualities of my glue, it may be mixed with a suitable percentage of dry powdered antiseptic material such as salicylic acid, boracic acid, etc.

Wherever in the specification or in the subjoined claims I have used the word "adhesive," I mean it to be used in the broadest sense and to include the various well-recognized uses of glue, either alone or in combination with other substances. Such uses include sizing, calcimine, etc. Furthermore, it will be apparent that my invention is not directed solely to the adhesive formed by the proportions and materials stated in the example above given, this example being merely illustrative of my invention and not in any sense restrictive.

Having thus described my invention, I claim:

1. An adhesive in solid form and soluble in water when added thereto at ordinary temperatures, comprising glue and a metallic chlorid whose action with water is exothermic.

2. An adhesive in solid form and soluble in water when added thereto at ordinary temperatures, comprising an intimate mixture of glue and a metallic chlorid whose action with water is exothermic, the proportions being such as to permit at least partial gelatinization of the glue upon cooling of the solution, said proportions being varied in accordance with the jelly strength of the glue.

3. An adhesive in solid form and soluble in water when added thereto at ordinary temperatures, comprising an intimate mixture of glue and calcium chlorid in sufficient quantity to appreciably aid in effecting solution.

4. An adhesive in solid form and soluble in water when added thereto at ordinary temperatures, comprising an intimate mixture of glue and calcium chlorid in such proportions as to cause a sensible increase in the temperature of water when dissolved therein and appreciably aid in effecting solution.

5. An adhesive in solid form and soluble in water when added thereto at ordinary temperatures, comprising finely divided glue and finely divided calcium chlorid, intimately mixed.

6. A cold water soluble glue comprising a dry mixture of finely divided glue and a metallic chlorid having a marked affinity for water, said chlorid tending to inhibit the formation of gel and causing the glue to dissolve in water at ordinary temperatures.

7. A cold water soluble glue comprising a dry mixture of finely divided glue and finely divided calcium chlorid, the quantity of glue being in excess of calcium chlorid and the ingredients being combined in such proportion that a solution in water at approximately 20 degrees centigrade may be formed containing approximately 43 per cent. of added water.

8. A cold water soluble glue comprising a dry mixture consisting of 50 parts of finely divided glue having a jelly test of approximately 50 incorporated with 17 parts of dry finely divided calcium chlorid.

9. An adhesive in solid form and soluble in water at ordinary temperatures, comprising a mixture of glue and a metallic chlorid whose presence in a solution of glue has the power of decreasing the jelly strength of the glue.

10. An adhesive in solid form and soluble in water at ordinary temperatures, comprising a mixture of glue and a metallic chlorid whose presence in said mixture tends to prevent gelatination.

JEROME ALEXANDER.

Witnesses:
CLARA KUJAWA,
A. H. VANDERHOEF.

Copies of this patent may be obtained for five cents each, by addressing the "Commissioner of Patents, Washington, D. C."